(12) United States Patent
Kong et al.

(10) Patent No.: US 9,578,211 B2
(45) Date of Patent: Feb. 21, 2017

(54) IMAGE DE-NOISING METHODS AND APPARATUSES USING THE SAME

(71) Applicant: VIA Alliance Semiconductor Co., Ltd., Shanghai (CN)

(72) Inventors: Weiman Kong, Beijing (CN); Xu Wang, Beijing (CN); Aimin Liang, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 14/958,015

(22) Filed: Dec. 3, 2015

(65) Prior Publication Data
US 2016/0337557 A1    Nov. 17, 2016

(30) Foreign Application Priority Data
May 14, 2015   (CN) .......................... 2015 1 0244493

(51) Int. Cl.
*H04N 5/217* (2011.01)
*H04N 5/265* (2006.01)
*G06T 7/20* (2006.01)
*H04N 5/232* (2006.01)

(52) U.S. Cl.
CPC ............... *H04N 5/217* (2013.01); *G06T 7/20* (2013.01); *H04N 5/232* (2013.01); *H04N 5/265* (2013.01)

(58) Field of Classification Search
CPC ........ H04N 5/217; H04N 5/265; H04N 5/232; H04N 5/21; H04N 5/213; H04N 5/357; H04N 5/3572; H04N 5/3577; G06T 7/20

USPC .................. 348/241, 243, 246, 247
See application file for complete search history.

(56) References Cited

U.S. PATENT DOCUMENTS

| | | | | |
|---|---|---|---|---|
| 6,563,497 | B1* | 5/2003 | Ebihara | H04N 5/275 345/419 |
| 2009/0278961 | A1* | 11/2009 | Mohanty | G06T 5/50 348/241 |
| 2014/0044366 | A1* | 2/2014 | Yamaguchi | G06T 11/60 382/232 |
| 2016/0028966 | A1* | 1/2016 | Sheikh | H04N 5/23296 348/240.2 |
| 2016/0037059 | A1* | 2/2016 | Lim | G06T 5/20 348/241 |

* cited by examiner

*Primary Examiner* — Yogesh Aggarwal
(74) *Attorney, Agent, or Firm* — McClure, Qualey & Rodack, LLP

(57) ABSTRACT

A method for generating and employing a camera noise model, performed by a processing unit, is introduced to at least contain the following steps. A camera noise model is provided. A first frame is obtained by controlling a camera module via a camera module controller. A blending ratio corresponding to each pixel value of the first frame is generated according to the camera noise model, the pixel value of the first frame and a corresponding pixel value of a second frame. A third frame is generated by fusing each pixel value of the first frame with the corresponding pixel value of the second frame according to the blending ratio. A de-nosing strength for each pixel value of the third frame is adjusted according to the blending ratio. Each pixel value of the third frame is adjusted using the corresponding de-nosing strength.

18 Claims, 9 Drawing Sheets

IMAGE DE-NOISING METHODS AND APPARATUSES USING THE SAME

CROSS REFERENCE TO RELATED APPLICATIONS

This application claims the benefit of China Patent Application No. CN201510244493.8, filed on May 14, 2015, the entirety of which is incorporated by reference herein.

BACKGROUND

Technical Field

The present invention relates to image processing, and in particular, it relates to image de-noising methods and apparatuses using the same.

Description of the Related Art

Image noise is the random variation of brightness or color information in images, and is usually an aspect of electronic noise. It may be produced by the sensor and circuitry of a scanner or digital camera. Image noise can also originate in film grain and in the unavoidable shot noise of a photon detector. Image noise is an undesirable by-product of image capture that adds spurious and extraneous information. Accordingly, what are needed are image de-noising methods and apparatuses using the same to reduce image noise.

BRIEF SUMMARY

A method for generating and employing a camera noise model, performed by a processing unit, is introduced to at least contain the following steps. A camera noise model is provided. A first frame is obtained by controlling a camera module via a camera module controller. A blending ratio corresponding to each pixel value of the first frame is generated according to the camera noise model, the pixel value of the first frame and a corresponding pixel value of a second frame. A third frame is generated by fusing each pixel value of the first frame with the corresponding pixel value of the second frame according to the blending ratio. A de-nosing strength for each pixel value of the third frame is adjusted according to the blending ratio. Each pixel value of the third frame is adjusted using the corresponding de-nosing strength.

An apparatus for de-noising from an image at least contains a frame buffer and a processing unit. The processing unit, coupled to the frame buffer, provides a camera noise model; obtains a first frame by controlling a camera module via a camera module controller; generates a blending ratio corresponding to each pixel value of the first frame according to the camera noise model, the pixel value of the first frame and a corresponding pixel value of a second frame; generates a third frame by fusing each pixel value of the first frame with the corresponding pixel value of the second frame according to the blending ratio; adjusts a de-nosing strength for each pixel value of the third frame according to the blending ratio; adjusts each pixel value of the third frame using the corresponding de-nosing strength; and stores the adjusted third frame in the frame buffer.

The inventive methods for de-noising from an image and apparatuses using the same determines whether a temporal de-noise is performed and a strength for the temporal de-noise (such as the aforementioned blending ratio) according to a camera noise model and a difference between each pixel value of a first frame and a corresponding pixel value of a second frame and adjusts a strength for a spatial de-noise according to the strength for the temporal de-noise, so as to reduce the effects caused by mistakenly treating a motion as noise.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
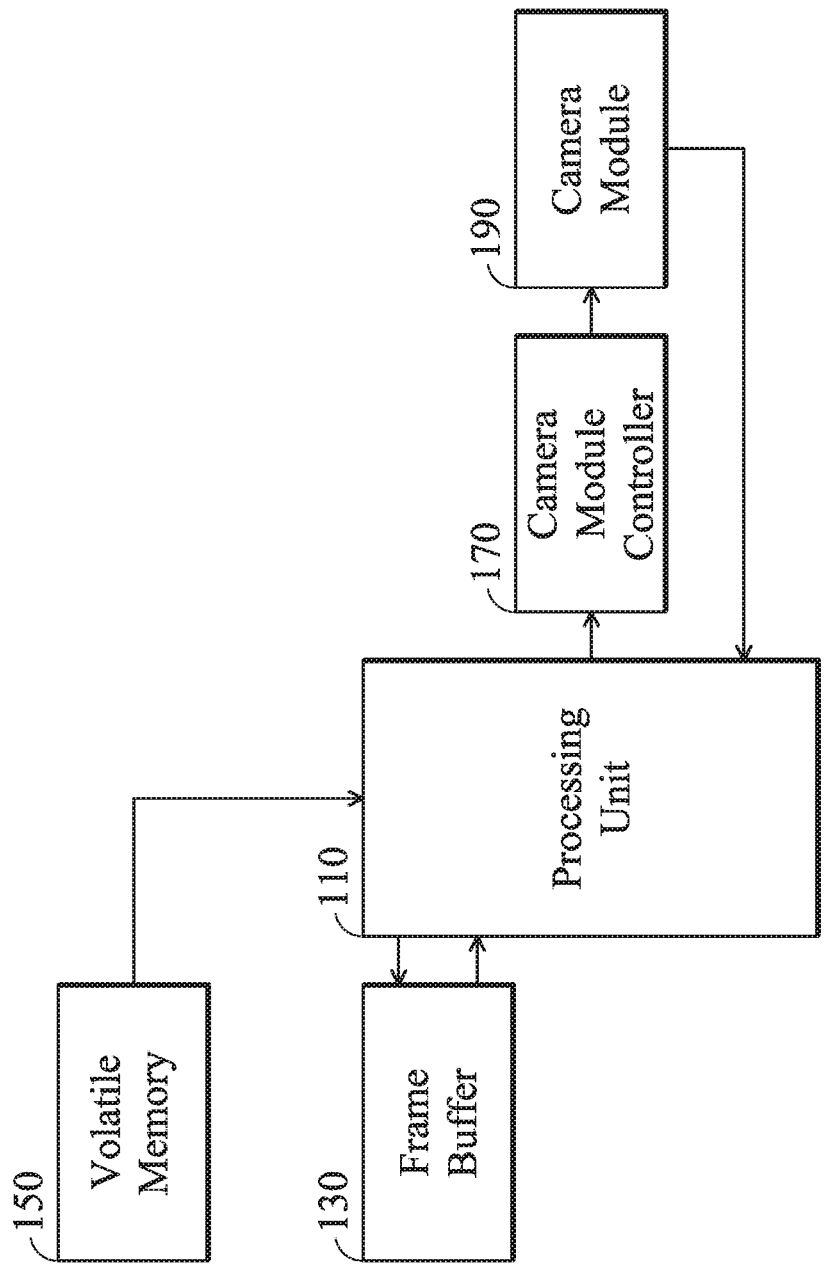
FIG. 1 is a schematic diagram illustrating the system architecture of a computer apparatus according to an embodiment of the invention.

FIG. 1 is a schematic diagram illustrating the system architecture of a computer apparatus according to an embodiment of the invention. The system architecture may be implemented in a desktop computer, a notebook computer, a tablet PC (personal computer), a mobile phone, a digital camera, a digital recorder, or another device which contains at least a processing unit 110. The processing unit 110 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The processing unit 110 may be integrated into an ISP (Image Signal Processor) and, via a camera module controller 170, control a camera module 190 to capture multiple frames. The camera module 190 may comprise an image sensor, such as a CMOS (complementary metal-oxide-semiconductor) or CCD (charge-coupled device) sensor, to detect an image in the form of a red, green and blue color, and readout electronic circuits for collecting the sensed data from the image sensor. A camera noise model is affected by not only a manufacturing process of image sensors but also environmental factors, such as temperature, humidity, shooting subjects, etc. A pre-calibrated camera noise model, which is generated off-line, cannot eliminate noise resulting from environmental factors. Thus, the processing unit 110 may generate a camera noise model according to a captured frame, use the generated camera noise model to adjust the following frames, and store the adjusted outcomes in a frame buffer 130. A volatile memory 150, such as a DRAM (Dynamic Random Access Memory), stores necessary data in execution, such as runtime variables, data tables, etc. An embodiment of a method for generating and employing a camera noise model, which is performed by the processing unit 110, controls the camera module 190 via the camera module controller 170 to obtain a frame first. A camera noise model, which describes relationships between pixel values and standard deviations, is generated on-line according to the content of the frame, where each pixel value indicates luminance values or strengths of a pixel in color channels (such as R-, Gr-, Gb- and B-channels). Subsequently, the camera module 190 is controlled via the camera module controller 170 to capture the next frame, the camera noise model calculated using the last frame in real-time is used to adjust the content of the next frame, and the adjusted outcome is stored in the frame buffer 130. That is, the invention uses the data of one frame to produce an on-line camera noise model in real-time and de-noises the next frame according to the camera noise model to achieve the operation of a pipeline. Compared with a pre-calibrated camera noise model generated off-line, the invention fully considers the environmental factors affecting image sensors in real time. In an embodiment, the camera module 190 obtains frames, each containing multiple blocks, and the processing unit 110 searches flat blocks of a current frame globally, where each flat block is associated with one of the pixel-value ranges and the flat block is one block having the minimum standard deviation and/or the minimum Hessian value among that of blocks falling within the pixel-value range. The following will describe how to search flat blocks. Thereafter, the camera noise model is fitted with the searched flat blocks. It should be noted that the embodiments are Bayer-block based and the camera noise models are established for color channels, respectively (such as R-, Gr-, Gb- and B-channels). Those skilled in the art may process frames with another format, and the invention should not be limited thereto.

Figure 2:
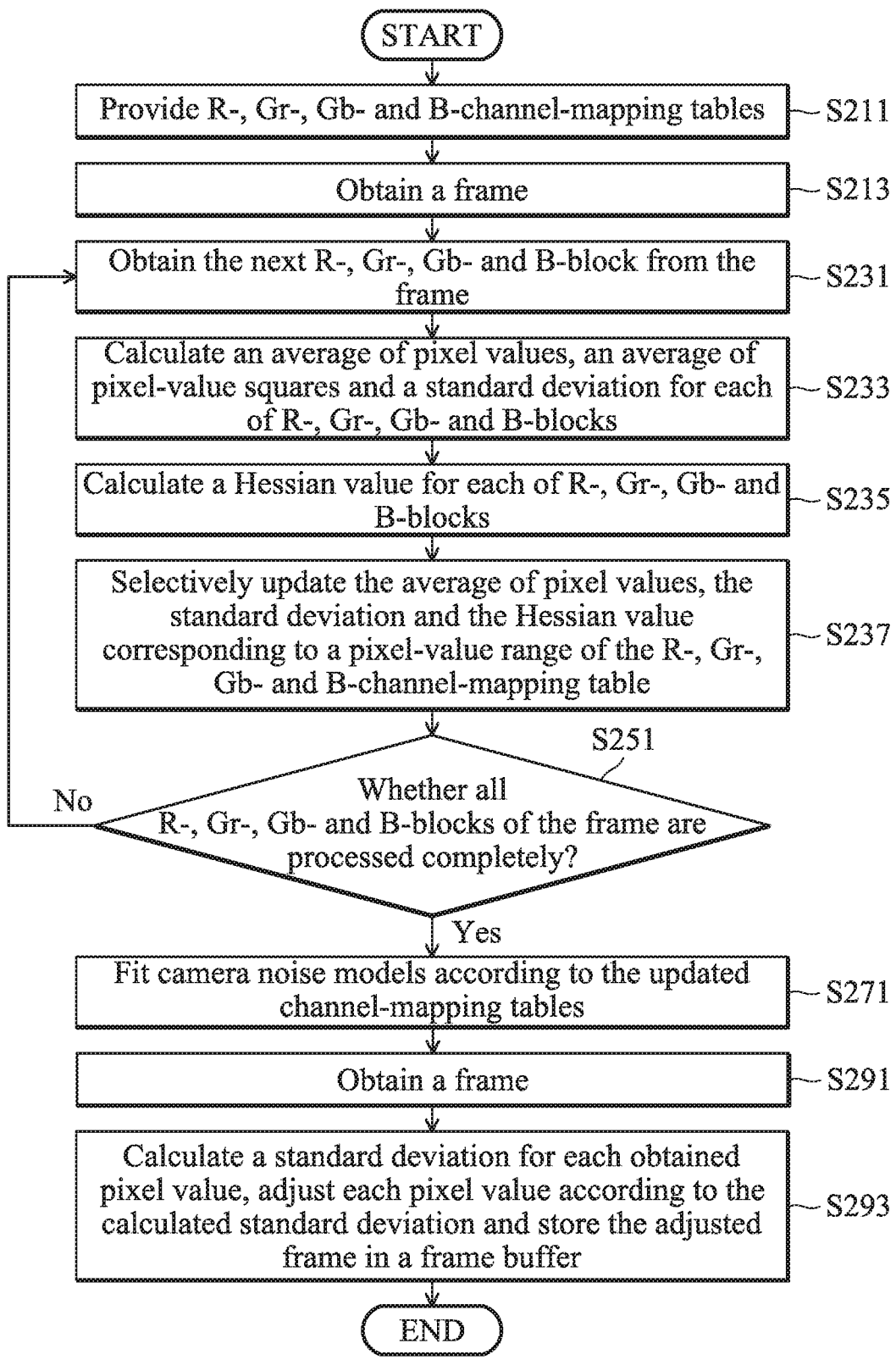
FIG. 2 is a flowchart illustrating a method for generating and employing a camera noise model, which is performed by a processing unit, according to an embodiment of the invention.

FIG. 2 is a flowchart illustrating a method for generating and employing a camera noise model, which is performed by a processing unit, according to an embodiment of the invention. The process begins by providing R-, Gr-, Gb- and B-channel-mapping tables (step S211). Each channel-mapping table contains multiple records, and each record stores a representative corresponding to a pixel-value range, a standard deviation corresponding to the pixel-value range, and a Hessian value corresponding to the pixel-value range. Using an R-channel in 12-bits as an example, the R-value of each pixel may be an arbitrary value between 0 and 4095. Assuming that each pixel-value range contains 32 pixel values, the R-channel-mapping table contains 128 records. The first record is associated with R-values from 0 to 31, the second record is associated with R-values from 32 to 63, and so on. Each standard deviation or Hessian value stored in the R-, Gr-, Gb- and B-channel mapping tables is the minimum one among that of blocks, which have been processed so far and fall within the same pixel-value range. It should be noted that those skilled in the art may configure the total amount of pixels within each pixel-value range as an arbitrary integer, such as 16, 32 or 64. The processing unit 110 controls the camera module 190 to obtain a frame via the camera module controller 170 (step S213), and then repeatedly executes a loop to update the R-, Gr-, Gb- and B-channel-mapping table according to the information of the frame (steps S231 to S251). After processing all the information of the frame (the "Yes" path of step S251), camera noise models for R-, Gr-, Gb- and B-channels are fitted according to the updated R-, Gr-, Gb- and B-channel-mapping table (step S271).

Figure 3:
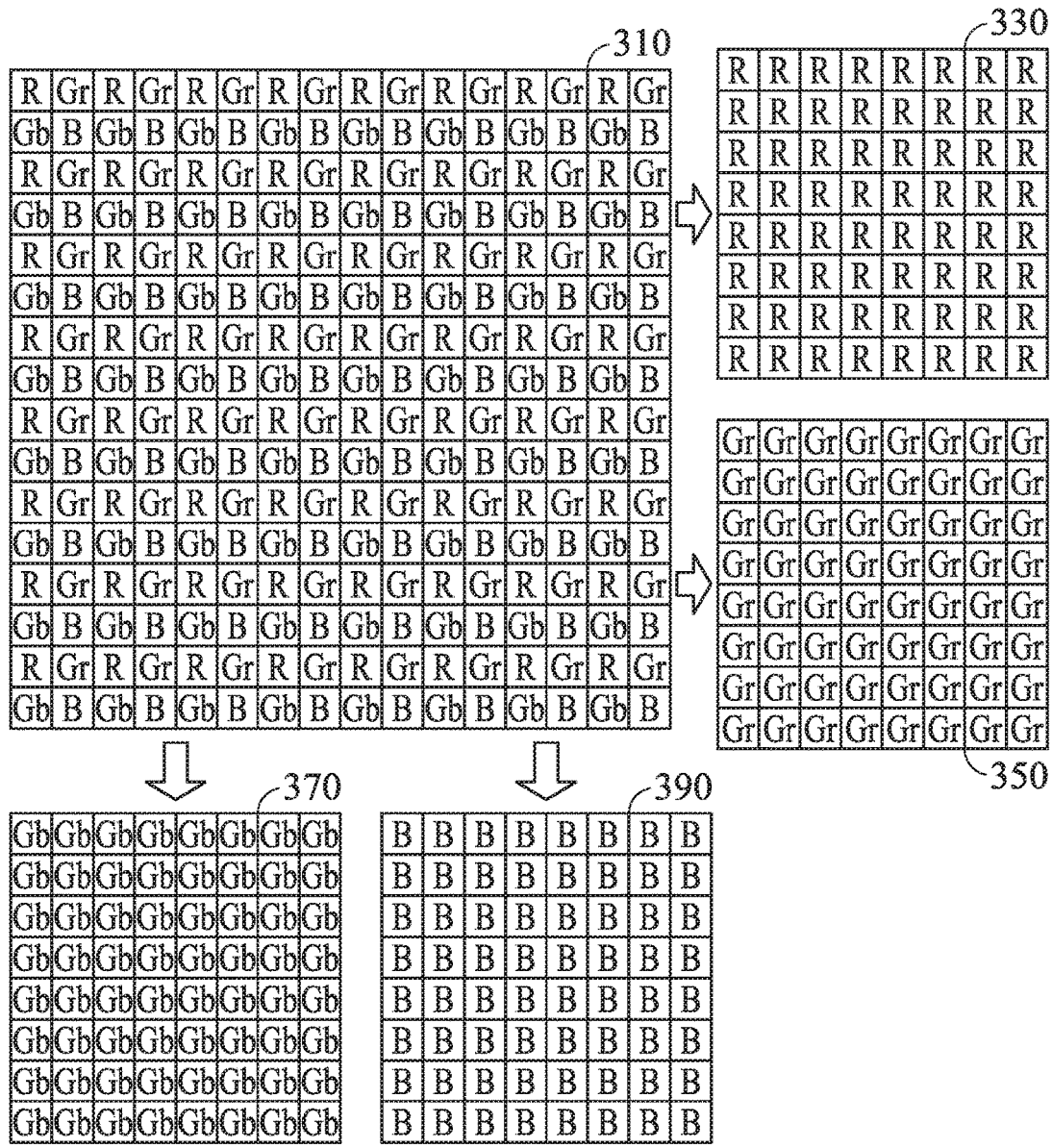
FIG. 3 is a schematic diagram for acquiring R-, Gr-, Gb- and B-pixels blocks according to an embodiment of the invention.
Figure 4A:
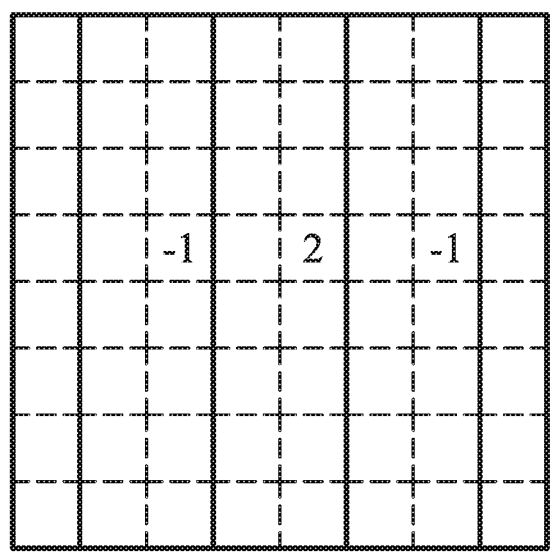
FIG. 4A is a schematic diagram of a first mode according to an embodiment of the invention.
Figure 4B:
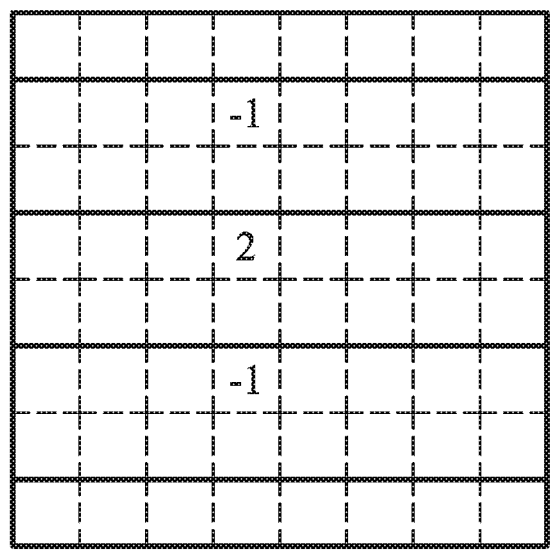
FIG. 4B is a schematic diagram of a second mode according to an embodiment of the invention.
Figure 4C:
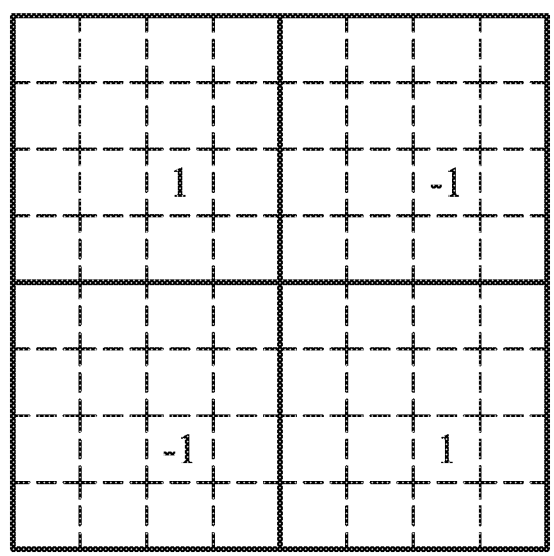
FIG. 4C is a schematic diagram of a third mode according to an embodiment of the invention.

Specifically, in each run, the processing unit 110 obtains the next R-, Gr-, Gb- and B-block from the frame (step S231). In step S231, pixels of the frame form a Bayer pattern, and the processing unit 110 collects (m/2)×(m/2) R-, Gr-, Gb- and B-pixels of a block from m×m pixels of the Bayer pattern in sequence. FIG. 3 is a schematic diagram for acquiring R-, Gr-, Gb- and B-pixels blocks according to an embodiment of the invention. For example, the processing unit 110 collects 8×8 pixels of an R-block 330, 8×8 pixels of a Gr-block 350, 8×8 pixels of a Gb-block 370 and 8×8 pixels of a B-block 390 from 16×16 pixels of a Bayer pattern 310 of the frame. Next, an average of the pixel values, an average of the pixel-value squares and a standard deviation for each of R-, Gr-, Gb- and B-blocks are calculated (step S233). In step S233, a standard deviation may be calculated using the Equation:

$$\sigma_x = \sqrt{E[x^2] - v_x^2} \quad (1)$$

where $\sigma_x$ indicates a standard deviation of a block (may be a R-, Gr-, Gb- or B-block), indicates an average of the pixel-value squares of the block and $\mu_x$ indicates an average of the pixel values of the block. A Hessian value for each of R-, Gr-, Gb- and B-blocks is calculated (step S235). In step S235, a Hessian value may be calculated using the Equation:

$$H = \max(fabs(H_{xx}), fabs(H_{yy}), fabs(H_{xy})) \quad (2)$$

where fabs( ) is the absolute function for floating numbers, max( ) is the maximum function, H indicates a Hessian value of a block (may be a R-, Gr-, Gb- or B-block), $H_{xx}$ indicates a first-mode value of the block, $H_{yy}$ indicates a second-mode value of the block and $H_{xy}$ indicates a third-mode value of the block. FIG. 4A is a schematic diagram of a first mode according to an embodiment of the invention. A first-mode value may be calculated using the Equation:

$$H_{xx} = \sum_{i=0}^{m/2-1} (-1) \times x_{1\_i} + (-1) \times x_{2\_i} + \\ 2 \times x_{3\_i} + 2 \times x_{4\_i} + (-1) \times x_{5\_i} + (-1) \times x_{6\_i} \quad (3)$$

where m indicates the total number of columns and x indicates a pixel value (may be a R-, Gr-, Gb- or B-value). FIG. 4B is a schematic diagram of a second mode according to an embodiment of the invention. A second-mode value may be calculated using the Equation:

$$H_{yy} = \sum_{j=0}^{m/2-1} (-1) \times x_{j\_1} + (-1) \times x_{j\_2} + \\ 2 \times x_{j\_3} + 2 \times x_{j\_4} + (-1) \times x_{j\_5} + (-1) \times x_{j\_6} \quad (4)$$

where m indicates the total number of rows and x indicates a pixel value (may be a R-, Gr-, Gb- or B-value). FIG. 4C is a schematic diagram of a third mode according to an embodiment of the invention. A third-mode value may be calculated using the Equation:

$$H_{xy} = \sum_{i=0}^{m/4-1}\sum_{j=0}^{m/4-1} 1 \times x_{i\_j} + \sum_{k=m/2}^{m-1}\sum_{l=0}^{m/4-1} (-1) \times x_{k\_l} + \\ \sum_{o=0}^{m/4-1}\sum_{p=m/2}^{m-1} (-1) \times x_{o\_p} + \sum_{q=m/2}^{m-1}\sum_{r=m/2}^{m-1} 1 \times x_{q\_r} \quad (5)$$

where m indicates the total number of columns or rows and x indicates a pixel value (may be a R-, Gr-, Gb- or B-value). The processing unit 110 selectively updates the average of the pixel values, the standard deviation, and the Hessian value corresponding to a pixel-value range of the R-, Gr-, Gb- and B-channel-mapping table (step S237). In step S237, specifically, for each of the R-, Gr-, Gb- and B-blocks, it is determined which pixel-value range that the calculated average of the pixel values falls within. Then, it is determined whether the standard deviation of a corresponding channel-mapping table, which is associated with the fallen pixel-value range, is greater than the calculated standard deviation, and the Hessian value of a corresponding channel-mapping table, which is associated with the fallen pixel-value range, is greater than the calculated Hessian value. When the two conditions are satisfied, the average of the pixel values, the standard deviation, and the Hessian value of a corresponding channel-mapping table, which are associated with the fallen pixel-value range, are updated with the calculated average of the pixel values, the calculated standard deviation, and the calculated Hessian value. Finally, it is determined whether all R-, Gr-, Gb- and B-blocks of the frame are processed completely (step S251). If so, the loop ends. Otherwise, the process goes back to step S231 to process the next R-, Gr-, Gb- and B-blocks. In the embodiment, step S237 stepwise collects a block with the minimum standard deviation and the minimum Hessian value among that of the other processed blocks for each pixel-value range and use the collected blocks to participate in the fitting of a camera noise model later. During the update process, it only needs to store, for each pixel-value range, the minimum average of the pixel values, the minimum standard deviation, and the minimum Hessian value among the others which have been calculated so far to save storage space.

Figure 5:
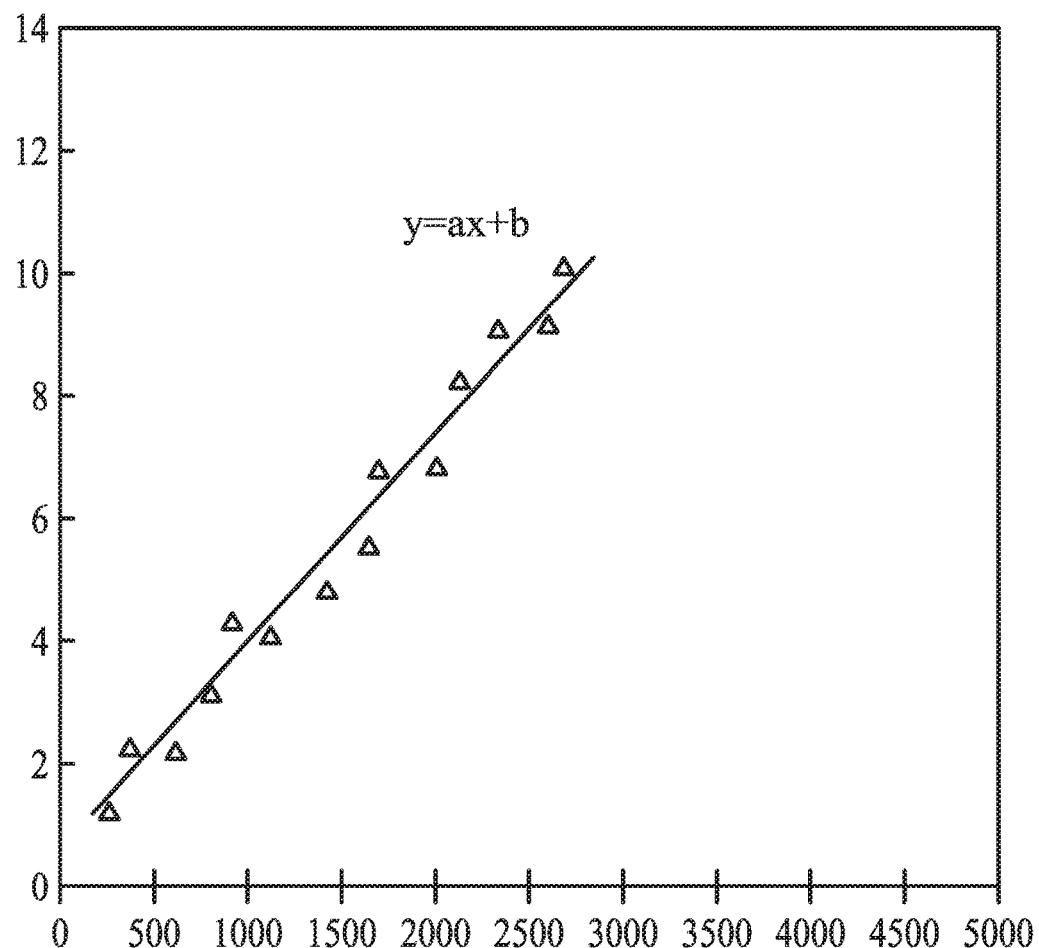
FIG. 5 is a schematic diagram of a camera noise model according to an embodiment of the invention.

In step S271, the processing unit 110 fits camera noise models according to the averages of the pixel values and the standard deviations for the pixel-value ranges, which are stored in the updated channel-mapping tables (R-, Gr-, Gb- and B-channel-mapping tables) and the processing unit 110 stores the fitted camera noise models in the volatile memory 150. Specifically, the camera noise model is a curve describing the relationships between pixel values (R-, Gr-, Gb- or B-values) and standard deviations. The curve fitting may employ a selective replacement algorithm, such as Ransac (Random Sample Consensus), etc. to conduct a further de-noise under the aforementioned basis of searching flat blocks globally. FIG. 5 is a schematic diagram of a camera noise model according to an embodiment of the invention. Assuming that the camera noise model is represented by Gaussian white noise, in which, for each sampling point, a pixel value is positively related to a standard deviation, and the average of the pixel value is 0, then the camera noise model may be represented by the Equation:

$$Y=a*X+b \quad (6)$$

where Y indicates a standard deviation, X indicates a pixel value of a pixel (may be a R-, Gr-, Gb- or B-value), a indicates a slope of the camera noise model and b indicates a y-intercept of the camera noise model. With other noise theories, the camera noise model may be represented in other types of curves, and the invention should not be limited thereto. In other embodiments, a default slope a and a default y-intercept b of an off-line camera noise model may be preserved. When the fitting of an on-line camera noise model is not successful, the default values of the off-line model are used to ensure the robustness of the algorithm.

Finally, the processing unit 110 may control the camera module 190 via the camera module controller 170 to obtain the next frame (step S291); may obtain pixel values of the frame pixel by pixel; may use a corresponding camera noise model of the volatile memory 150 to calculate a standard deviation for each obtained pixel value; may adjust each pixel value according to the calculated standard deviation; and may store the adjusted frame in a frame buffer 130 after all pixel values are completely adjusted (step S293). The adjustment details are described in FIGS. 6 to 8.

Figure 6:
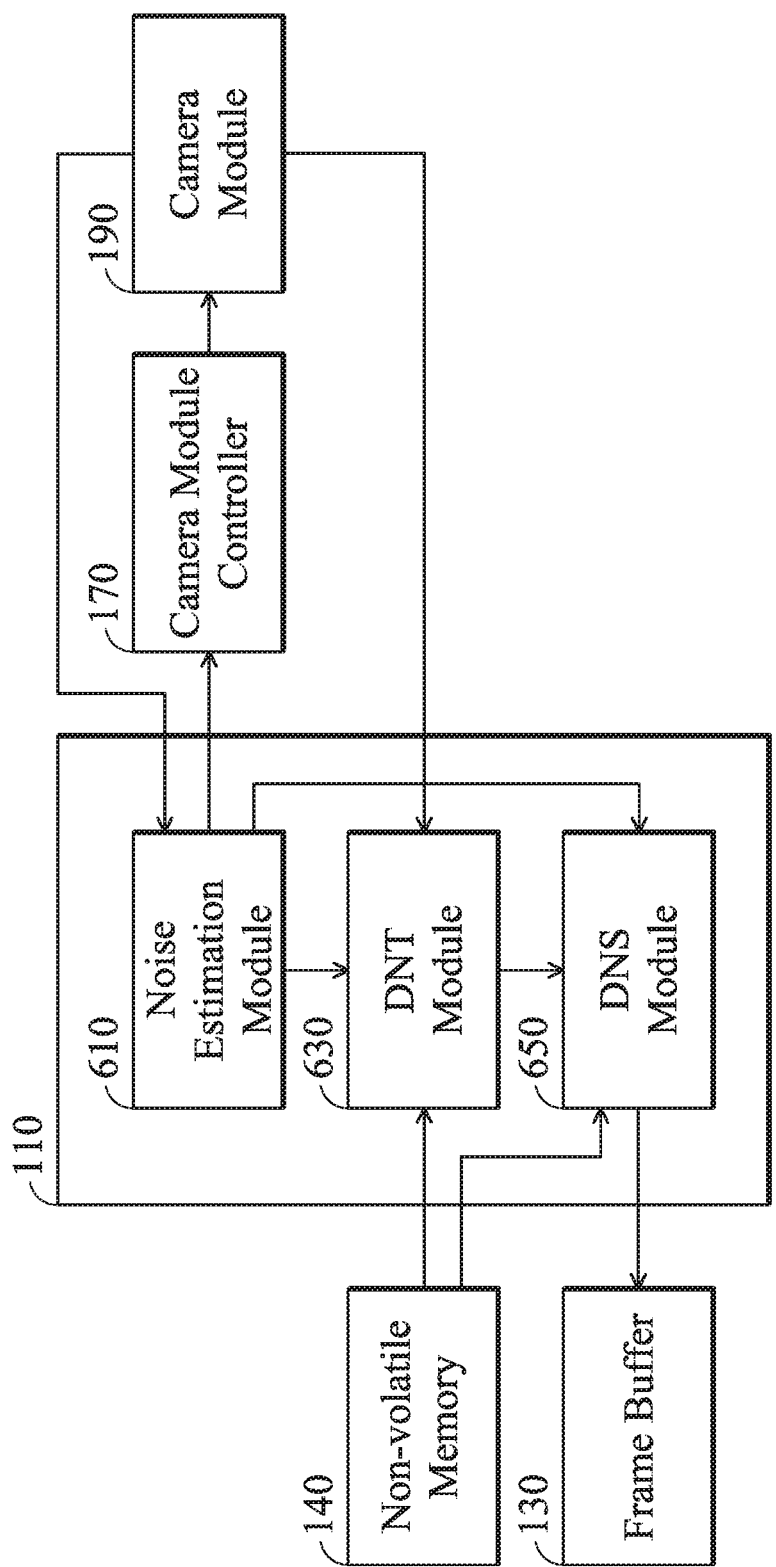
FIG. 6 is the system block diagram illustrating a camera de-noise apparatus according to an embodiment of the invention.

FIG. 6 is the system block diagram illustrating a camera de-noise apparatus according to an embodiment of the invention. A noise estimation module 610 may control the camera module 190 via the camera module controller 170 to capture a frame, and generate a camera noise model according to the captured frame. Details for generating a camera noise model may be found by referring to the description of FIGS. 2 to 5. It should be noted that the noise estimation module 610 may use other ways to generate the camera noise model and the invention should not be limited thereto. A DNT (De-Noise Temporal) module 630 may obtain the camera noise model from the noise estimation module 610 or obtain a default camera noise model from a non-volatile memory 140 and control the camera module 190 via the camera module controller 170 to capture another frame, referred to hereinafter as the current frame. The DNT module 630 generates a blending ratio corresponding to each pixel value according to the camera noise model and each pixel value (may be a R-, Gr-, Gb- or B-value) of the current frame and each pixel value of a reference frame, and generates a temporary frame by fusing pixel values of the current frame with that of the reference frame according to the generated blending ratios. It should be noted that the reference frame may be a frame prior to the current frame, and has undergone a de-noise process by the DNT module 630. That is, the reference frame is an accumulated frame. A DNS (De-Noise Spatial) module 650 obtains the temporary frame from the DNT module 630. In an embodiment, the DNS module 650 further calculates a de-noise strength for each pixel value of the temporary frame by using the camera noise model, obtains a blending ratio for each pixel value of the temporary frame and adjusts a final de-noise strength for each pixel value of the temporary frame by using the corresponding blending ratio. Subsequently, the DNS module 650 adjusts each pixel value of the temporary frame using the final de-noise strength to generate a resulting fame. Finally, the DNS module 650 stores the resulting frame in the frame buffer 130.

Figure 7:
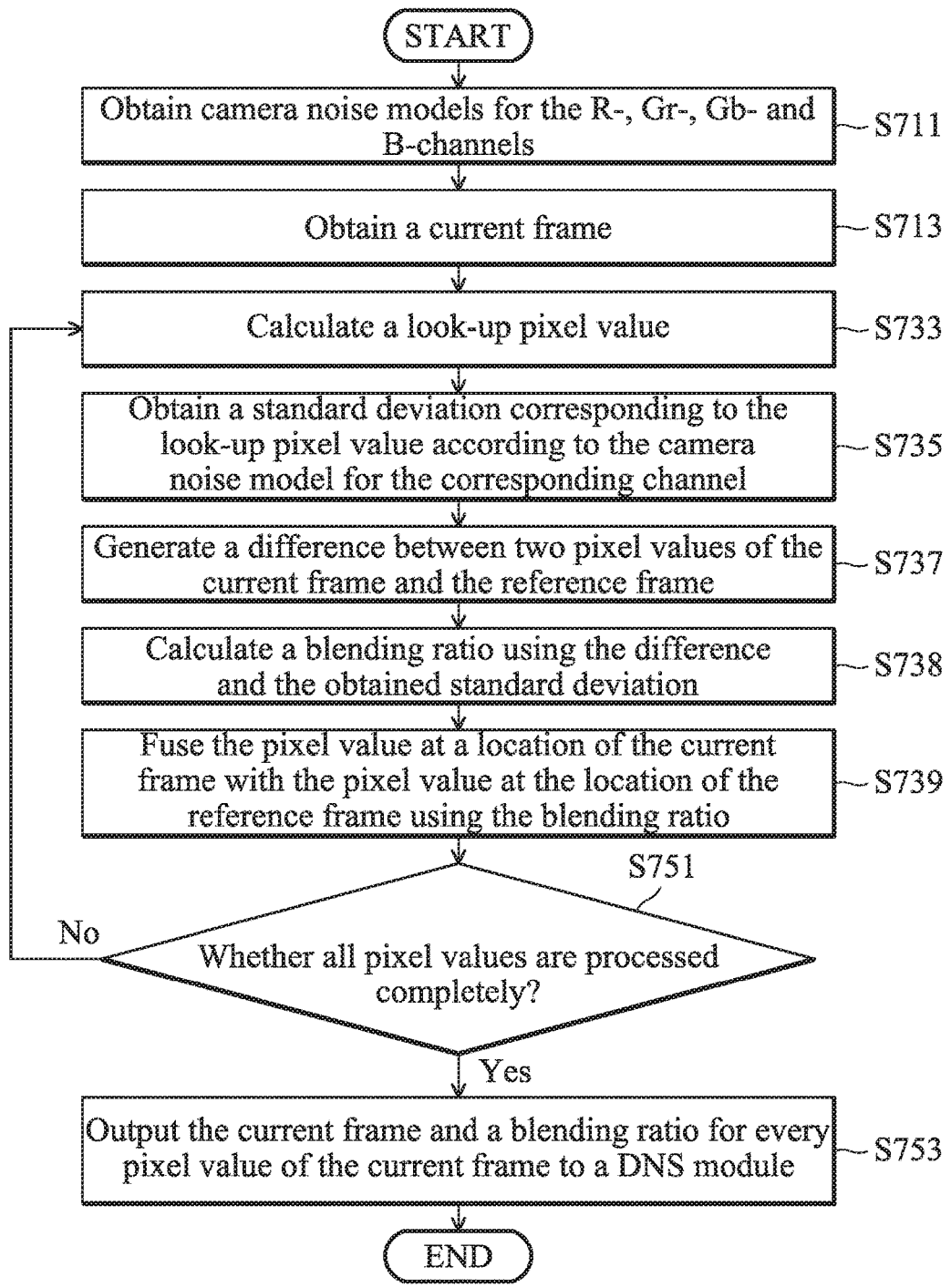
FIG. 7 is a flowchart illustrating a method for a temporal de-noise when a processing unit loads and executes relevant instructions of a DNT (De-Noise Temporal) module according to an embodiment of the invention.

FIG. 7 is a flowchart illustrating a method for a temporal de-noise when the processing unit 110 loads and executes relevant instructions of the DNT module 630 according to an embodiment of the invention. The process begins by obtaining camera noise models for the R-, Gr-, Gb- and B-channels (step S711) and obtaining a current frame by controlling the camera module 190 via the camera module controller 170 (step S713). In step S711, the camera noise models for the R-, Gr-, Gb- and B-channels may be obtained from the noise estimation module 610 or the non-volatile memory 140. Then, a loop (steps S733 to S751) is repeatedly performed to fuse every R-, Gr-, Gb- and B-pixel of the current frame with that of the reference frame so as to eliminate temporal noise therefrom. Specifically, the processing unit 110 calculates a look-up pixel value according to a pixel value at the location of the current frame (step S733). In an embodiment, the processing unit 110 obtains pixel values (may be R-, Gr-, Gb- or B-value) at the locations of the current frame and the reference frame and calculates the average of the two pixel values of the current frame and the reference frame as the look-up pixel value. In other embodiments, the pixel value at the location of the current frame may be directly treated as the look-up pixel value. Thereafter, the processing unit 110 obtains a standard deviation corresponding to the look-up pixel value according to the camera noise model for the corresponding channel (step S735). In step S733, the look-up pixel value may be calculated using the Equation:

$$X_{lookup}=(Intensity_1+Intensity_2)/2 \quad (7)$$

where $X_{lookup}$ indicates a look-up pixel value, $Intensity_1$ indicates a pixel value (may be a R-, Gr-, Gb- or B-value) at the location of the current frame and $Intensity_2$ indicates a pixel value (may be a R-, Gr-, Gb- or B-value) at the location of the reference frame. In step S735, the processing unit 110 may obtain a standard deviation corresponding to the look-up pixel value according to a camera noise model of the corresponding channel. Subsequently, the processing unit 110 generates a difference between two pixel values of the current frame and the reference frame (step S737), calculates a blending ratio using the difference and the obtained standard deviation (step S738) and fuses the pixel value at the location of the current frame with the pixel value at the location of the reference frame using the blending ratio (step S739). In step S738, the blending ratio may be calculated using the Equation:

$$Ratio=d*diff/e*std \quad (8)$$

where Ratio indicates a blending ratio, d indicates a blending strength, diff indicates the difference, e indicates a noise confidence (such as, an arbitrary value between 1 and 2) and std indicates a standard deviation. In step S739, the fusion of a pixel value at the location of the current frame with a pixel value at the location of the reference frame may be calculated using the Equation:

$$X_{curr}=X_{curr}*(Ratio)+X_{ref}*(1-Ratio) \quad (9)$$

where $X_{curr}$ indicates a pixel value at the location of the current frame, Ratio indicates a blending ratio of the location and $X_{ref}$ indicates a pixel value at the location of the reference frame. Finally, the processing unit 110 determines whether all pixel values are processed completely (step S751). If so, a blending ratio for every pixel value of the current frame is output to the DNS module 650 (step S753). Otherwise, the process proceeds to deal with the next pixel value (step S733). It should be noted that, in order to improve precision, in step S737, the processing unit 110 may use n×n blocks (such as, 3×3 blocks or 5×5 blocks) surrounding a pixel value at the location of the current frame and the reference frame to calculate the difference. In some embodiments, the processing unit 110 further determines whether the n×n blocks surrounding the pixel value enclose a texture. In cases where no texture is enclosed within the n×n surrounding blocks, a difference of the average pixel values is obtained as the difference in step S737 so as to further distinguish noise from a border of a texture, so that no mistake will occur even with tiny texture. In other embodiments, step S739 further determines whether a motion is presented between the current frame and the reference frame, which is associated with the pixel value, according to the calculated blending ratio when using the blending ratio to fuse two pixel values at the location of the current frame and the reference frame to generate the temporary frame. If no motion is presented, then the blending ratio is used to fuse two pixel values at the location of the current frame and the reference frame. If any motion is presented, then the pixel value of the current frame is used to generate the temporary frame directly. For example, when a scene change is determined, the current frame is treated directly as the temporary frame. Specifically, with reference made to the equation (9), a blending ratio Ratio for a location being greater than or equal to 1 indicates that a motion is presented, that is, the difference between the current frame and the reference frame is caused by a motion, and Ratio of the equation (9) is set to 1. A blending ratio Ratio for a location being less than 1 indicates that no motion is presented, that is, the difference between the current frame and the reference frame is caused by noise, and Ratio of the equation (9) is set to the blending ratio calculated in step S738.

Figure 8:
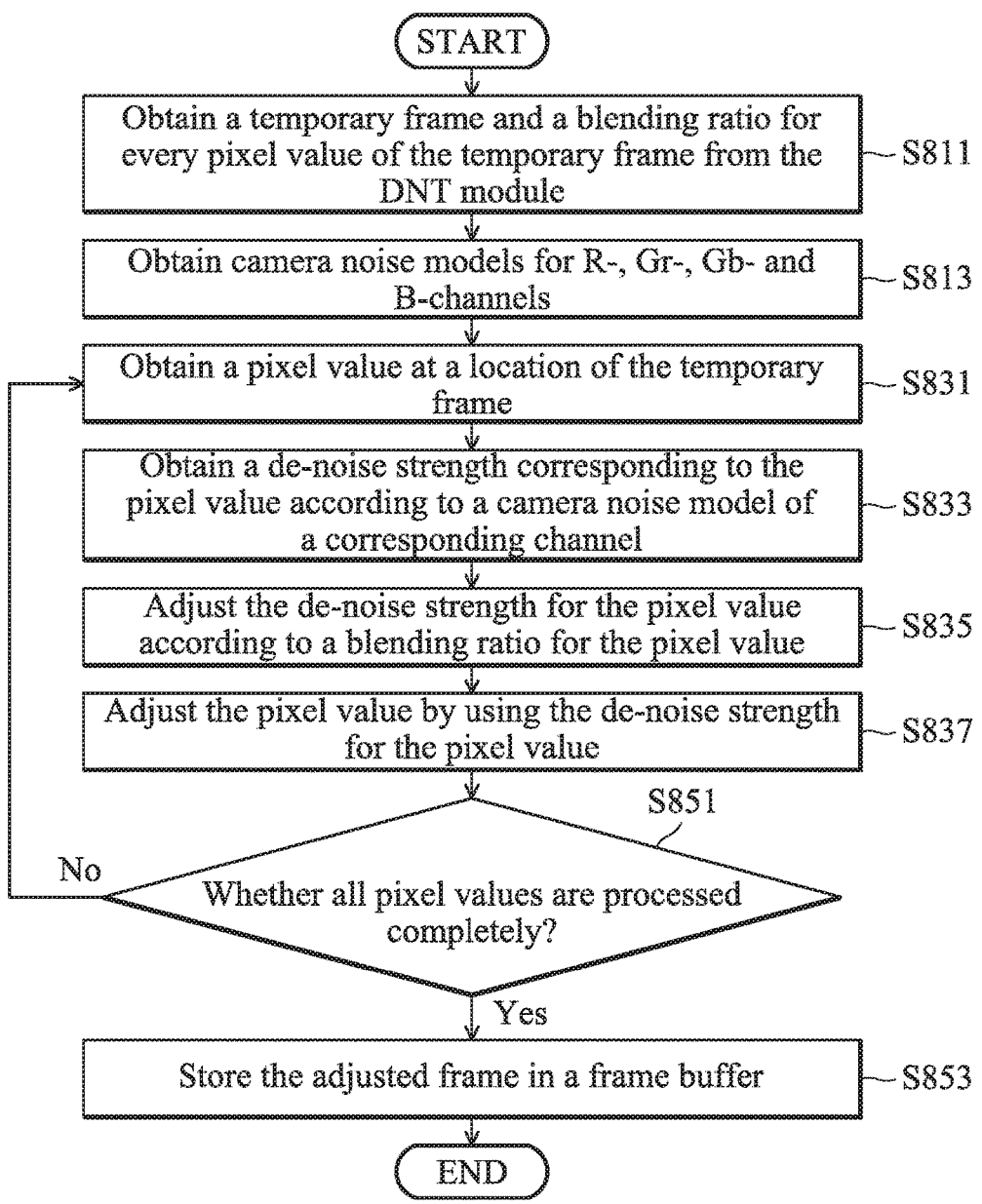
FIG. 8 is a flowchart illustrating a method for spatial de-noise when a processing unit loads and executes relevant instructions of a DNS (De-Noise Spatial) module according to an embodiment of the invention.

FIG. 8 is a flowchart illustrating a method for spatial de-noise when the processing unit 110 loads and executes relevant instructions of the DNS module 650 according to an embodiment of the invention. The process begins by obtaining the temporary frame and a blending ratio for every pixel value of the temporary frame from the DNT module 630 (step S811) and obtaining camera noise models for the R-, Gr-, Gb- and B-channels (step S813). In an embodiment, the temporary frame in step S811 is the frame fused by and output from the DNT module 630. In step S813, the camera noise models for the R-, Gr-, Gb and B-channels may be obtained from the noise estimation module 610 or the non-volatile memory 140. Subsequently, a loop (steps S831 to S851) is repeatedly performed to adjust every R-, Gr-, Gb- and B-values of the current frame so as to eliminate spatial noise therefrom. Specifically, the processing unit 110 obtains a pixel value (may be a R-, Gr-, Gb- or B-value) at the location of the temporary frame (step S831), obtains a de-noise strength corresponding to the pixel value according to a camera noise model of a corresponding channel (step S833) and adjusts the de-noise strength for the pixel value according to a blending ratio for the pixel value (step S835). The adjustment to the de-noise strength may be calculated using the Equation:

$$fSigma=Ratio*fSigma \quad (10)$$

fSigma indicates a de-noise strength and Ratio indicates a blending ratio. That is, the DNS module 650 obtains the temporary frame and a blending ratio corresponding to every pixel value of the temporary frame from the DNT module 630 and uses the blending ratio to adjust the de-noise strength. The DNT module 630 may mistakenly determine that a pixel value of the current frame is related to there being no motion; that is, mistakenly treating motion as noise, and fusing the pixel value of the current frame with the corresponding pixel value of the reference frame to achieve a temporal de-noise. In order to decrease the effects caused by the aforementioned mistakes, the embodiment of the invention adjusts the de-noise strength for spatial de-noise according to the temporal de-noise strength (such as the blending ratio). Subsequently, the processing unit 110 adjusts the pixel value by using the de-noise strength for the pixel value (step S837). Finally, the processing unit 110 determines whether all pixel values are processed completely (step S851). If so, the adjusted frame is stored in the frame buffer 130 (step S853). Otherwise, the process proceeds to deal with the next pixel value (step S831).

Although the embodiment has been described in FIGS. 1 and 6 as having specific elements, it should be noted that additional elements may be included to achieve better performance without departing from the spirit of the invention. While the process flows described in FIGS. 2, 7 and 8 include a number of operations that appear to occur in a specific order, it should be apparent that these processes can include more or fewer operations, which can be executed serially or in parallel, e.g., using parallel processors or a multi-threading environment.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for de-noising from an image, performed by a processing unit, the method comprising:
   providing a camera noise model;
   obtaining a first frame by controlling a camera module via a camera module controller;
   generating a blending ratio corresponding to each pixel value of the first frame according to the camera noise model, the pixel value of the first frame and a corresponding pixel value of a second frame;
   generating a third frame by fusing each pixel value of the first frame with the corresponding pixel value of the second frame according to the blending ratio;
   adjusting a de-nosing strength for each pixel value of the third frame according to the blending ratio; and
   adjusting each pixel value of the third frame using the corresponding de-nosing strength.

2. The method of claim 1, wherein the step for generating a third frame by fusing each pixel value of the first frame with the corresponding pixel value of the second frame according to the blending ratio further comprises:
   determining whether a motion is presented between each pixel value of the first frame and the corresponding pixel value of the second frame according to the blending ratio; and
   if no motion is presented, then using the corresponding blend ratio to fuse each pixel value of the first frame with the corresponding pixel value of the second frame so as to generate the third frame.

3. The method of claim 1, wherein the fusion of each pixel value of the first frame with the corresponding pixel value of the second frame is calculated by an Equation:

$$X_{curr}=X_{curr}*(Ratio)+X_{ref}*(1-Ratio)$$

where $X_{curr}$ indicates any pixel value of the first frame, Ratio indicates the corresponding blending ratio and $X_{ref}$ indicates the corresponding pixel value of the second frame.

4. The method of claim 1, wherein the step for generating a blending ratio corresponding to each pixel value of the first frame according to the camera noise model, the pixel value of the first frame and a corresponding pixel value of a second frame further comprises:
   calculating a look-up pixel value corresponding to each pixel value of the first frame;
   obtaining a standard deviation corresponding to the look-up pixel value according to the camera noise model;
   generating a difference between each pixel value of the first frame and the corresponding pixel value of the second value; and
   calculating the corresponding blending ratio using each difference and the corresponding standard deviation.

5. The method of claim 4, wherein the step for generating a third frame by fusing each pixel value of the first frame with the corresponding pixel value of the second frame according to the blending ratio further comprises:
   determining whether a motion is presented between each pixel value of the first frame and the corresponding pixel value of the second frame according to the blending ratio;
   if no motion is presented, then using corresponding blend ratio to fuse each pixel value of the first frame with the corresponding pixel value of the second frame so as to generate the third frame; and
   if any motion is presented, then using each pixel value of the first frame to generate the third frame directly.

6. The method of claim 4, wherein the look-up pixel value is calculated by an Equation:

$$X_{lookup}=(Intensity_1+Intensity_2)/2;$$

where $X_{lookup}$ indicates the look-up pixel value, $Intensity_1$ indicates any pixel value of the first frame and $Intensity_2$ indicates the corresponding pixel value of the second frame.

7. The method of claim 4, wherein the blending ratio is calculated by an Equation:

$$Ratio=d*diff/e*std$$

where Ratio indicates the blending ratio, d indicates a blending strength, diff indicates the difference, e indicates a noise confidence and std indicates the standard deviation.

8. The method of claim 1, wherein the de-nosing strength is calculated by an Equation:

$$fSigma=Ratio*fSigma$$

where fSigma indicates the de-noise strength and Ratio indicates the blending ratio.

9. The method of claim 4, wherein the step for generating a difference between each pixel value of the first frame and the corresponding pixel value of the second value further comprises:
determining whether a plurality of blocks surrounding each pixel value of the first frame encloses a texture; and
if no texture is enclosed, then treating difference between a first average of pixel values of the surrounding blocks of each pixel value of the first frame and a second average of pixel values of the surrounding blocks of the corresponding pixel value of the second frame as the difference.

10. An apparatus for de-noising from an image, comprising:
a frame buffer; and
a processing unit, coupled to the frame buffer, providing a camera noise model; obtaining a first frame by controlling a camera module via a camera module controller; generating a blending ratio corresponding to each pixel value of the first frame according to the camera noise model, the pixel value of the first frame and a corresponding pixel value of a second frame; generating a third frame by fusing each pixel value of the first frame with the corresponding pixel value of the second frame according to the blending ratio; adjusting a de-nosing strength for each pixel value of the third frame according to the blending ratio; adjusting each pixel value of the third frame using the corresponding de-nosing strength; and storing the adjusted third frame in the frame buffer.

11. The apparatus of claim 10, wherein the processing unit determines whether a motion is presented between each pixel value of the first frame and the corresponding pixel value of the second frame according to the blending ratio; and if no motion is presented, then uses the corresponding blend ratio to fuse each pixel value of the first frame with the corresponding pixel value of the second frame so as to generate the third frame.

12. The apparatus of claim 10, wherein the fusion of each pixel value of the first frame with the corresponding pixel value of the second frame is calculated by an Equation:

$$X_{curr}=X_{curr}*(\text{Ratio})+X_{ref}*(1-\text{Ratio})$$

where $X_{curr}$ indicates any pixel value of the first frame, Ratio indicates the corresponding blending ratio and $X_{ref}$ indicates the corresponding pixel value of the second frame.

13. The apparatus of claim 10, wherein the processing unit calculates a look-up pixel value corresponding to each pixel value of the first frame; obtains a standard deviation corresponding to the look-up pixel value according to the camera noise model; generates a difference between each pixel value of the first frame and the corresponding pixel value of the second value; and calculates the corresponding blending ratio using each difference and the corresponding standard deviation.

14. The apparatus of claim 13, wherein the processing unit determines whether a motion is presented between each pixel value of the first frame and the corresponding pixel value of the second frame according to the blending ratio; if no motion is presented, then uses corresponding blend ratio to fuse each pixel value of the first frame with the corresponding pixel value of the second frame so as to generate the third frame; and if any motion is presented, then uses each pixel value of the first frame to generate the third frame directly.

15. The apparatus of claim 13, wherein the look-up pixel value is calculated by an Equation:

$$X_{lookup}=(\text{Intensity}_1+\text{Intensity}_2)/2;$$

where $X_{lookup}$ indicates the look-up pixel value, $\text{Intensity}_1$ indicates any pixel value of the first frame and $\text{Intensity}_2$ indicates the corresponding pixel value of the second frame.

16. The apparatus of claim 13, wherein the blending ratio is calculated by an Equation:

$$\text{Ratio}=d*\text{diff}/e*std$$

where Ratio indicates the blending ratio, d indicates a blending strength, diff indicates the difference, e indicates a noise confidence and std indicates the standard deviation.

17. The apparatus of claim 10, wherein the de-nosing strength is calculated by an Equation:

$$f\text{Sigma}=\text{Ratio}*f\text{Sigma}$$

where fSigma indicates the de-noise strength and Ratio indicates the blending ratio.

18. The apparatus of claim 13, wherein the processing unit determining whether a plurality of blocks surrounding each pixel value of the first frame encloses a texture; and if no texture is enclosed, then treats difference between a first average of pixel values of the surrounding blocks of each pixel value of the first frame and a second average of pixel values of the surrounding blocks of the corresponding pixel value of the second frame as the difference.

* * * * *